US012717922B2

(12) United States Patent
Tambekar et al.

(10) Patent No.: US 12,717,922 B2
(45) Date of Patent: Aug. 25, 2026

(54) ENHANCING ZERO-TRUST VALIDATOR SERVICES IN COMPUTER APPLIANCE SUPPLY CHAINS

(71) Applicant: Dell Products L.P., Round Rock, TX (US)

(72) Inventors: Piyush Tambekar, Pune (IN); Abhidnya Joshi, Pune (IN); Mukesh Sharma, Pune (IN)

(73) Assignee: Dell Products L.P., Round Rock, TX (US)

( * ) Notice: Subject to any disclaimer, the term of this patent is extended or adjusted under 35 U.S.C. 154(b) by 307 days.

(21) Appl. No.: 18/405,140

(22) Filed: Jan. 5, 2024

(65) Prior Publication Data

US 2025/0225248 A1 Jul. 10, 2025

(51) Int. Cl.
*G06F 21/57* (2013.01)
*G06F 21/60* (2013.01)

(52) U.S. Cl.
CPC .......... *G06F 21/575* (2013.01); *G06F 21/577* (2013.01); *G06F 21/604* (2013.01)

(58) Field of Classification Search
None
See application file for complete search history.

(56) References Cited

U.S. PATENT DOCUMENTS 11,176,255 B2 * 11/2021 Callaghan ............. H04L 9/3239
2019/0132308 A1 * 5/2019 Graham ............. H04L 63/0876

* cited by examiner

*Primary Examiner* — Farid Homayounmehr
*Assistant Examiner* — Suman Debnath
(74) *Attorney, Agent, or Firm* — Dergosits & Noah LLP; Todd A. Noah

(57) ABSTRACT

If a computer appliance is shutting down at an appliance factory, a system identifies a factory-based state of the computer appliance at the appliance factory, wherein the factory-based state includes information about system configurations, user accounts, and/or system boot up parameters identified at the appliance factory. If the computer appliance boots up while onsite at a customer location, the system identifies an onsite-based state of the computer appliance that is onsite at a customer location, wherein the onsite-based state includes information about system configurations, user accounts, and/or system boot up parameters identified while onsite at the customer location. The system identifies any changes between the factory-based state of the computer appliance and the onsite-based state of the computer appliance. The system outputs a notification that enables any required action based on any identified changes between the factory-based state of the computer appliance and the onsite-based state of the computer appliance.

20 Claims, 3 Drawing Sheets

100
102
Network 106
104
Backup / Restore Application 108
Backup Files 110
Data Objects 112
Zero-Trust Validator Service 114

120
122
124
126
128
Network 134
130
Backup / Restore Application 136
Backup Files 138
Data Objects 140
Zero-Trust Validator Service 144
Cloud Storage 132
Backup Files 142

ENHANCING ZERO-TRUST VALIDATOR SERVICES IN COMPUTER APPLIANCE SUPPLY CHAINS

BACKGROUND

A computer appliance can be an electronic device system with a combination of hardware, software, and/or firmware that is specifically designed to provide a particular computing resource. Such devices became known as appliances because of the similarity in role or management to home appliances, which are generally closed and sealed, and are not serviceable by the user or owner. The hardware and software are delivered as an integrated product, and may even be pre-configured before delivery to a customer, to provide a turn-key solution for a particular application. Unlike general purpose computers, appliances are generally not designed to allow the customers to change the software and the underlying operating system, or to flexibly reconfigure the hardware.

Traditionally, software applications execute on a general-purpose operating system, which uses the hardware resources of the computer (primarily memory, disk storage, processing power, and networking bandwidth) to meet the computing needs of the user. The main issue with the traditional model is related to complexity. It is complex to integrate the operating system and applications with a hardware platform, and complex to support it afterwards.

By tightly constraining the variations of the hardware and software, the appliance becomes easily deployable, and may be used without nearly as wide or deep Information Technology knowledge. Additionally, when problems and errors appear, the supporting staff very rarely needs to explore them deeply to understand the matter thoroughly. The staff needs only training on the appliance management software to be able to resolve most problems.

Customers benefit from easy operations of the computer appliance. The appliance has exactly one combination of hardware and operating system and application software, which has been pre-installed at the factory. This prevents customers from needing to perform complex integration work, and dramatically simplifies troubleshooting. In fact, this "turnkey operation" characteristic is the driving benefit that customers seek when purchasing appliances.

To be considered an appliance, the hardware device needs to be integrated with software, and both are supplied as a package. This distinguishes appliances from "home grown" solutions, or solutions requiring complex implementations by integrators or value-added resellers. The appliance approach helps to decouple the various systems and applications, such as in a data center. Once a resource is decoupled, in theory it can also be centralized to become shared among many systems, centrally managed and optimized, all without requiring changes to any other system. For example, backup and disaster recovery appliances are computer appliances that are integrated backup hardware and installed software, sometimes with hypervisors to support local disaster recovery of protected servers.

Typically, a supply chain for a computer appliance consists of various stages such as a customer order of the computer appliance, hardware product manufacturing, appliance hardware integration in an appliance factory (or manufacturing facility) of the computer appliance, operating system installation, and basic software installation and hardware configuration in the appliance factory. During these processes, there are cryptographic components/entities and software products created on the computer appliance. A standard security practice is to replace cryptographic keys used at the appliance factory when a computer appliance is subsequently deployed while onsite at a customer's location. After the computer appliance is configured and transported to the customer's location, a technician can perform onsite installation and configuration of the computer appliance. Since security related risks are possible at every stage of the supply chain, various security checks adhering to a zero-trust policy may be implemented at each stage.

Dell's PowerEdge servers have a secured component verification component which helps detect any mismatch in the configuration or any replacement of hardware components. Some of Dell's products also have a software bill of material which is typically used to keep inventory of the software installable on a computer appliance and track software vulnerabilities and software versions to mitigate risks via software upgrades. The software bill of material also helps to understand what software is expected to be installed on a particular computer appliance.

However, the combination of these described efforts is still not sufficient to completely eradicate the possibility of a security breach in a computer appliance, which can occur after a malicious actor logs in to a computer appliance which is yet to be configured at a customer's location. A security breach is sometimes possible when new computer appliances come with default passwords, which may enable a malicious actor to log in to a new computer appliance and create an additional user account or gain access to an existing user account which can later function as a back door access for the malicious actor.

DETAILED DESCRIPTION

Figures 1A, 1B:
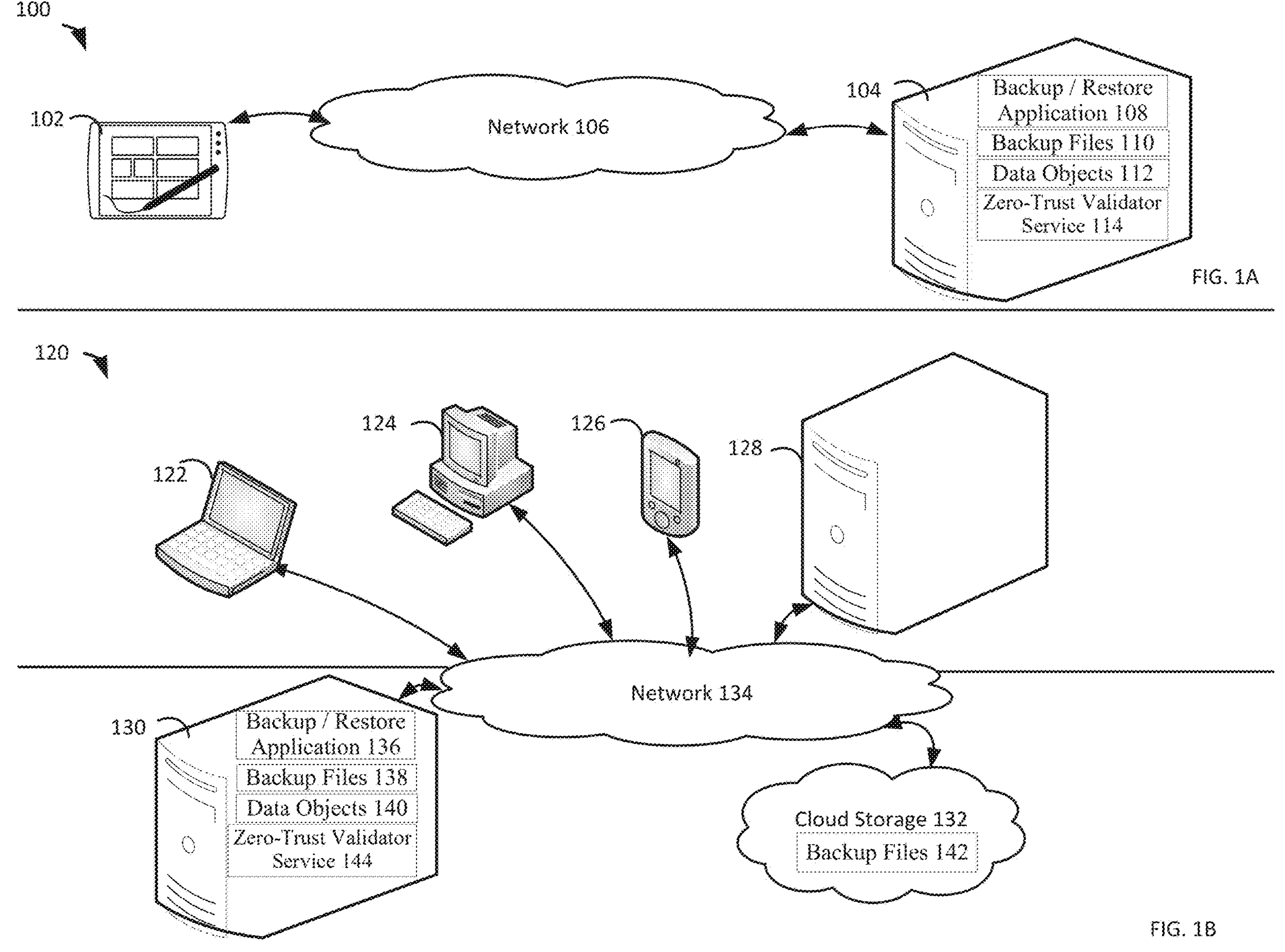
FIG. 1A illustrates a block diagram of an example system for enhancing zero-trust validator services in computer appliance supply chains, under an embodiment.
FIG. 1B illustrates a block diagram of a system for enhancing zero-trust validator services in computer appliance supply chains, under an embodiment.

After being manufactured or assembled at an appliance factory or manufacturing facility, a computer appliance is then shipped via a transport to a customer's location, where the customer can initiate installation and configuration processes for onsite operations. Various systems and methods for a "zero-trust" policy use a secured component verification process, use a software bill of material, replace all cryptographic keys, and execute additional steps after referring to a Specification and Descriptive Language [SDL] page. Some Dell products have implemented basic hardware checks to ensure that a computer appliance shipped to a customer's location is free of many security issues.

However, the need remains to perform an overall holistic validation of the hardware as well as the software bundle of a computer appliance before the initial installation and configuration begins while onsite at the customer location. This disclosure proposes a system and a method that, in addition to performing existing security verification methods, enhances a zero-trust validator service prior to a Day 1 installation and configuration on a computer appliance that is onsite at a customer location.

Embodiments of the present disclosure enhance zero-trust validator services in computer appliance supply chains. If a computer appliance is shutting down at an appliance factory, a system identifies a factory-based state of the computer appliance at the appliance factory, wherein the factory-based state includes information about system configurations, user accounts, and/or system boot up parameters identified at the appliance factory. If the computer appliance boots up at a customer location, the system identifies an onsite-based state of the computer appliance that is onsite at a customer location, wherein the onsite-based state includes information about system configurations, user accounts, and/or system boot up parameters identified at the appliance factory. The system identifies any changes between the factory-based state of the computer appliance and the onsite-based state of the computer appliance. The system outputs a notification that enables any required action based on any identified changes between the factory-based state of the computer appliance and the onsite-based state of the computer appliance.

For example, if an Acme Co. computer appliance, which has been configured as a backup and disaster recovery appliance, is beginning to shut down at Acme's appliance factory, a system identifies the factory-based state of the Acme backup appliance, with the factory-based state including information about system configurations, user accounts, and system boot up parameters identified at the Acme appliance factory. If the Acme backup appliance is booting up while onsite at the newest office of Megamax Corporation, the system identifies the onsite-based state of the Acme backup appliance which has just arrived at the newest Megamax office from the Acme appliance factory, with the onsite-based state including information about system configurations, user accounts, and system boot up parameters.

The system identifies changes between the factory-based state of the Acme backup appliance and the onsite-based state of the Acme backup appliance, which includes changes to the default user accounts present, the default privileges for user accounts, and the size of specific applications, which indicates that the size of a disaster recovery application file has increased. The system outputs a notification that enables the customer's security agents to review the unauthorized addition of a system account to an automated user, the unauthorized addition of super user privileges to the automated user's account, and the unauthorized addition of executable code to the disaster recovery application file for the computer appliance, which may have ordinarily escaped detection because the size of the added code is small relative to the size of the disaster recovery application file. Upon further investigation, the customer's security agents determine that when a commonly accessed part of the disaster recovery application would have been accessed, executable code would have been initiated for the automated user, which would have had a default user account and default privileges to access all of the Acme backup appliance, and that a Megamax employee who was recently denied a promotion had access to the newly received Acme backup appliance during the time when the unauthorized changes occurred.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "an embodiment" or "the embodiment" in various places in the specification do not necessarily all refer to the same embodiment.

FIG. 1A illustrates a diagram of a system 100 for enhancing zero-trust validator services in computer appliance supply chains, under an embodiment. As shown in FIG. 1A, the system 100 may illustrate a computing environment in which data, applications, services, and other application resources are stored and delivered through shared data centers and appear as a single point of access for the users. The system 100 may also represent any other type of distributed computer network environment in which appliances control the storage and distribution of application resources and services for different client users.

In an embodiment, the system 100 includes a client 102 and a computer appliance 104 which communicate via a network 106. Although FIG. 1A depicts the client 102 as a tablet device 102, the client 102 may be any type of computer. Even though FIG. 1A depicts the system 100 with one client 102, one computer appliance 104, and one network 106, the system 100 may include any number of clients 102, any number of computer appliances 104, and any number of networks 106. The client 102 and the computer appliance 104 may each be substantially similar to the system 300 depicted in FIG. 3 and described below.

The computer appliance 104, which may be referred to as a factory-based computer appliance 104, can include any type of application 108, such as a backup/restore application 108 that can create backup files 110 of data objects 112 for the client 102, and execute a restore based on the backup files 110. The backup/restore application 108 can be Dell Corporation's PowerProtect® backup/restore application, Dell Corporation's NetWorker® backup/restore application, or Dell Corporation's Avamar® backup/restore application, any other type of backup/restore application, or any other type of application. The backup/restore application 108 can provide centralized administration, such as scheduling, monitoring, and managing backup operations and backup files. The backup/restore application 108 can enable the storing of backup operation schedules, client policies, and client configurations. The backup/restore application 108 can provide a unique interface to the client 102 during login, and assist the factory-based computer appliance 104 in authenticating and registering the client 102.

The backup/restore application 108 can send backup/restore work orders to the client 102, which can receive and process the work orders to start a backup or restore operation. The backup/restore application 108 can maintain a local database of all processes that are executed on the factory-based computer appliance 104. The backup/restore application 108 can execute server-side processes for a system administrator's graphical management console, which may enable the system administrator to use command line interface tools for queries. For example, a system administrator identifies the client 102 registered with the factory-based computer appliance 104.

FIG. 1B illustrates a diagram of a system 120 for enhancing zero-trust validator services in computer appliance supply chains, under an embodiment. As shown in FIG. 1B, the system 120 may illustrate a cloud computing environment in which data, applications, services, and other application resources are stored and delivered through shared data centers and appear as a single point of access for the users. The system 120 may also represent any other type of distributed computer network environment in which appliances control the storage and distribution of application resources and services for different client users.

In an embodiment, the system 120 represents a cloud computing system that includes a first client 122, a second client 124, a third client 126, a fourth client 128, and a computer appliance 130 and a cloud storage 132 that communicate via a network 134. Although FIG. 1B depicts the first client 122 as a laptop computer 122, the second client 124 as a personal computer 124, the third client 126 as a smartphone 126, and the fourth client 128 as a server 128, each of the clients 122-128 may be any type of computer. Even though FIG. 1B depicts the system 100 with four clients 122-128, one computer appliance 130, one cloud storage 132, and one network 134, the system 120 may include any number of clients 122-128 any number of computer appliances 130, any number of cloud storages 132, and any number of networks 134. The clients 122-128 and the computer appliance 130 may each be substantially similar to the system 300 depicted in FIG. 3 and described below.

The computer appliance 130, which may be referred to as an onsite-based computer appliance 130, can include any type of application 136, such as a backup/restore application 136 that can create backup files 138 and backup files 140 of data objects 142 for the clients 122-128, and execute a restore based on the backup files 138 and/or backup files 140. The backup/restore application 136 can be Dell Corporation's PowerProtect® backup/restore application, Dell Corporation's NetWorker® backup/restore application, or Dell Corporation's Avamar® backup/restore application, any other type of backup/restore application, or any other type of application. The backup/restore application 136 can provide centralized administration, such as scheduling, monitoring, and managing backup operations, backup files 138, and backup files 140. The backup/restore application 136 can enable the storing of backup operation schedules, client policies, and client configurations. The backup/restore application 136 can provide a unique interface to the clients 122-128 during login, and assist the onsite-based computer appliance 130 in authenticating and registering the clients 122-128.

The backup/restore application 136 can send backup/restore work orders to the clients 122-128, which can receive and process the work orders to start a backup or restore operation. The backup/restore application 136 can maintain a local database of all processes that are executed on the onsite-based computer appliance 130. The backup/restore application 136 can execute server-side processes for a system administrator's graphical management console, which may enable the system administrator to use command line interface tools for queries. For example, a system administrator identifies the clients 122-128 registered with the onsite-based computer appliance 130. Although FIG. 1B depicts one set of backup files 138 residing completely on the onsite-based computer appliance 130 and one set of backup files 140 residing completely on the cloud storage 132, any number of the sets of files 138-140 may reside in any combination of partially or completely on the onsite-based computer appliance 130, on another appliance which is not depicted in FIG. 1B, on the cloud storage 132, and on the clients 102-108.

A zero-trust validator service 114 is a new service that is introduced within the factory-based computer appliance 104 that gets shipped to the customer location, where the factory-based computer appliance 104 becomes the onsite-based computer appliance 130, and the zero-trust validator service 114 becomes the zero-trust validator service 144. The zero-trust validator service 114 and the zero-trust validator service 144 will hold a reference of standard. The standard includes hardware and the software bill of material of all the binaries that are installed on the factory-based computer appliance 104 and the onsite-based computer appliance 130, along with their corresponding hash sums, unique standard default user account references, hardware products, and built-in malware scanners.

The solution explained in this disclosure proposes a system and/or a method which can help compare the exact "state" of the computer appliance 104 in an appliance factory, which after transit becomes the computer appliance 130 that is onsite at a customer location, and the exact "state" of the computer appliance 130 that is onsite at the customer location. This state of the factory-based computer appliance 104 is captured when the factory-based computer appliance 104 is shutting down in the appliance factory and later when the onsite-based computer appliance 130 boots up while onsite at a customer location. The state of the computer appliances 104 and the state of the computer appliance 130 can include information for all software installed on the computer appliance 104 and the computer appliance 130, respectively, and the inventory and specification of all hardware integrated into the computer appliance 104 and the computer appliance 130, respectively. While onsite at the customer location, a technician or an application in the onsite-based computer appliance 130 can use a software bill of material to verify all software installed on the factory-based computer appliance 104 at the appliance factory and use the secured component verification component to verify the inventory and specification of all hardware integrated into the factory-based computer appliance 104 at the appliance factory.

The state of the factory-based computer appliance 104 can include additional information about the factory-based computer appliance 104 while shutting down at the appliance factory, and the state of the onsite-based computer appliance 130 can include additional information about the onsite-based computer appliance 130 upon system boot up while onsite at the customer location. This additional information can include information about 1) default internet protocol table rules, 2) default user accounts present on the computer appliance 104/130, 3) default privileges for user accounts, 4) default file system mounts present, 5) the file and directory inventory, 6) the size of specific applications on disk, such as a database application, 7) ensuring that a secure boot up is enabled for the Unified Extensible Firmware Interface, and 8) ensuring that the only cryptographic keys present for the Unified Extensible Firmware Interface's secure boot ups are keys from the manufacturer of the computer appliance or approved by the manufacturer in advance. The state of the computer appliance 104/130 can also include any additional information that is changed in the computer appliance 104 after leaving the appliance factory but before the computer appliance 130 completes the Day 1 configuration, installation, and initialization while onsite at the customer location.

Upon identifying a change in the state of the onsite-based computer appliance 130, relative to the state of the factory-based computer appliance 104, the zero-trust validator service 144 generates a notification to ensure that any required action may be taken based on the change in state. If there is no change identified in the state of the onsite-based computer appliance 130 relative to the state of the factory-based computer appliance 104, then the zero-trust validator service 144 shuts down, which enables software customizations to be performed as applicable.

In summary, a zero-trust validator service 114 is introduced into a supply chain for a computer appliance 104. After confirming that the expected hardware is integrated into the computer appliance 104 and the expected software has been installed at an appliance factory, the zero-trust validator service 114 identifies the factory-based state of the computer appliance 104, which includes the integrated hardware, the installed software, the system configurations, the user accounts, and the system boot up parameters, while the computer appliance 104 is shutting down at the appliance factory. After the computer appliance 104 is transported from the appliance factory and becomes the onsite-based computer appliance 130 by arriving onsite at the customer location, the zero-trust validator service 114 becomes the zero-trust validator service 144 and verifies whether the hardware integration and the software installation remain the same in the onsite-based computer appliance 130 as they were in the factory-based computer appliance 104. Then, upon system boot-up while onsite at the customer's location, the zero-trust validator service 144 identifies the current state of the onsite-based computer appliance 130 which includes information about system configurations, user accounts, and system boot up parameters, and compares the newly identified onsite-based state of the computer appliance 130 against the previously identified factory-based state of the computer appliance 104, which includes information about the system configurations, user accounts, and system boot up parameters which were previously stored while at the appliance factory that produced the computer appliance 104. If the zero-trust validator service 144 identifies any change between the factory-based state of the computer appliance 104 and the onsite-based state of the computer appliance 130, the zero-trust validator service 144 generates a notification to ensure that any required action may be taken based on the change in state. If there is no change identified between the factory-based state of the computer appliance 104 and the onsite-based state of the computer appliance 130, then the zero-trust validator service 144 shuts down.

Figure 2:
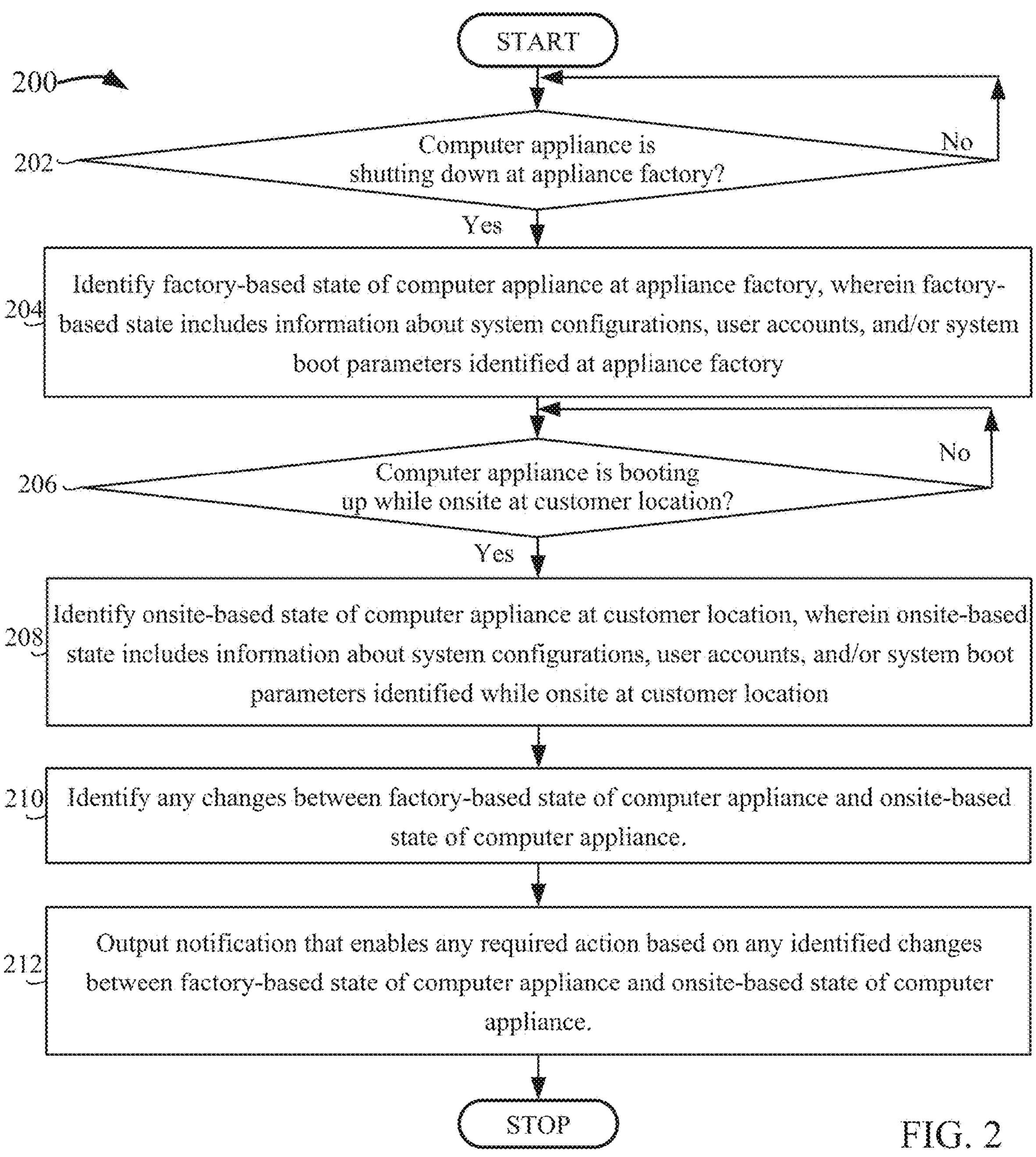
FIG. 2 is a flowchart that illustrates an example method for enhancing zero-trust validator services in computer appliance supply chains, under an embodiment.

FIG. 2 is a flowchart 200 that illustrates a method for intent-driven storage tiers that protect and relocate assets in an embodiment. Flowchart 200 depicts method acts illustrated as flowchart blocks for certain steps involving the client 102 and the factory-based computer appliance 104 of FIG. 1A, or the clients 122-128 and the onsite-based computer appliance 130 of FIG. 1B.

A determination is made whether a computer appliance is shutting down at an appliance factory, block 202. The system is initiated to compare the information about a computer appliance before and after its transit from a factory to a customer. For example, and without limitation, this can include the zero-trust validator service 114 determining that an Acme Co. computer appliance 104, which has been configured as a backup and disaster recovery appliance, is beginning to shut down at Acme's appliance factory. A shut down or shutting down can be a preparation for a controlled removal of power from a computer's main components. An appliance factory can be a manufacturing facility for an electronic device system.

If the computer appliance 104 is shutting down at an appliance factory, the flowchart 200 continues to block 204 for the zero-trust validator service 114 to identify a factory-based state of the computer appliance 104 at the appliance factory. If the computer appliance 104 is not yet shutting down at the appliance factory, the flowchart 200 remains at block 202 to continue monitoring until the computer appliance 104 begins shutting down at the appliance factory.

After a computer appliance begins shutting down, a factory-based state of the computer appliance is identified at an appliance factory, wherein the factory-based state includes information about system configurations, user accounts, and/or system boot up parameters identified at the appliance factory, block 204. The system identifies the information about a computer appliance before its transit from a factory to a customer. By way of example and without limitation, this can include the zero-trust validator service 114 identifying the factory-based state of the Acme backup appliance 104, with the factory-based state including information about system configurations, user account, and system boot up parameters identified at the Acme appliance factory.

A factory-based state can be a particular condition related to a manufacturing facility. Information can be facts provided or learned about something. A system configuration can be an arrangement of an electronic device. A user account can be information that enables an individual to access a computer. A system boot up parameter can be a selectable option for a process of starting a computer and loading software into the computer's memory.

The factory-based state optionally includes information about software installed and hardware integrated at the appliance factory. For example, the zero-trust validator service 114 uses a secured component verification component to record information about what hardware was integrated at the appliance factory, and subsequently uses this factory-based information to compare against the corresponding onsite-based information which is subsequently recorded at a customer location to verify that what was installed, configured at integrated at the factory remains what is now present while onsite at the customer location. The secured component verification plays a critical role by detecting any mismatch in configuration or replacement of hardware components. In another example, the zero-trust validator service 114 uses the factory-based information of a software bill of material to compare against the corresponding onsite-based information which is recorded at a customer location to verify all software installed on the factory-based computer appliance 104 at the appliance factory is now present while onsite at the customer location. Software can be the programs and other operating information used by a computer. Hardware can be a computer's tangible components or delivery systems that store and run the written instructions provided by the software.

The system configurations can include information about default internet protocol table rules, default file system mounts present on a corresponding computer appliance, file and directory inventory, and/or sizes corresponding to specific applications. For example, information about default internet protocol table rules identify which internet protocols and which ports will be used to connect with the corresponding computer appliance, such that a change in these rules may indicate a high likelihood of a forthcoming attempt by an unknown user to gain unauthorized access to the corresponding computer appliance. In another example, information about default file system mounts present on a corresponding computer appliance identifies users and system components that have the capability to mount file systems and access data on the mounted file systems, which are typically a self-contained world's capabilities not available to the outside world. In yet another example, information about default file and directory inventory identifies files and directories in a corresponding computer appliance, which can identify added files or directories that when accessed might create security risks. In an additional example, information about each application's size, which system users seldom check to verify the size remains unchanged, can identify if an application has increased in size due to something that a malicious user may have added to the application, such as filling a large database application to cause denial of service to potential users.

Default internet protocol table rules can be a preselected option for a data structure that includes information used to restrict a set of standards for addressing and routing data on networks and logical connections that are assigned to each external application. Default file system mounts can be a preselected option for providing availability of a computer object that stores data for an organized framework. File and directory inventory can be a complete list of the elements in a cataloging structure which contains references to computer objects that store data. A size can be the relative extent of a thing's overall dimensions or magnitude, generally referred to as how big something is compared to other things or to the previous condition of the same thing. A specific application can be a particular computer software package that, based on carefully designed features, performs a specific function for an end user or another computer software package.

The information about user accounts includes information about default user accounts present on a corresponding computer appliance and/or default privileges for user accounts present on the corresponding computer appliance. For example, the information about default user accounts present on a corresponding computer appliance identifies the users and the system component that upon boot-up of the corresponding computer appliance will have user accounts for accessing the corresponding computer appliance. In another example, the information about default privileges for user accounts present on a corresponding computer appliance identifies the access rights and privileges that the default users accounts and system components will have upon boot-up for accessing the corresponding computer appliance, such as a system administrator who is a super user has virtually all rights and privileges when accessing the corresponding computer appliance. A default user account can be a preselected option for information that enables an individual to access a computer. A default privilege can be a preselected option for the access rights that an individual has for a computer.

The system boot up parameters include information that verifies that a boot up file is required to have a digital certificate that is valid to boot up the computer appliance, and/or identifies that specific encryption keys are present on the computer appliance to validate the digital certificate required for the boot up file. For example, the system boot up parameters include information ensuring that a secure boot up is enabled for the Unified Extensible Firmware Interface, and ensuring that the only cryptographic keys present for the Unified Extensible Firmware Interface's secure boot ups are keys from Dell, the manufacturer of the corresponding computer appliance. A boot up file can be a computer object that stores a process for starting a computer and loading software into the computer's memory. A digital certificate can be a file or electronic password that proves the authenticity of a device, server, or user through the use of cryptography. Valid can be correct, authenticated, or officially acceptable.

Following the shutdown of a computer appliance at an appliance factory, a determination is made whether the computer appliance is booting up while onsite at a customer location, block 206. The system is initiated to identify the information about a computer appliance after its transit from a factory to a customer. In embodiments, this can include the zero-trust validator service 144 determining whether that the Acme backup appliance 130 is booting up while onsite at the newest office of Megamax Corporation.

A boot up or booting up can be a process for starting a computer and loading software into the computer's memory. Onsite can be located at a particular place where people work. A customer location can be a particular place associated with a person or organization that buys goods or services from a business.

If the computer appliance 110 is booting up while onsite at a customer location, the flowchart 200 continues to block 208 for the zero-trust validator service 144 to identify an onsite-based state of the computer appliance 110 while onsite at the customer location. If the computer appliance 110 is not yet booting up while onsite at a customer location, the flowchart 200 remains at block 206 to continue monitoring until the computer appliance 110 begins booting up while onsite at a customer location.

If a computer appliance is booting up while onsite at a customer location, an onsite-based state of the computer appliance is identified at the customer location, wherein the onsite-based state includes information about system configurations, user accounts, and/or system boot up parameters identified while onsite at the customer location, block 208. The system identifies information about a computer appliance after the appliance's transit from a factory to a customer. For example, and without limitation, this can include the zero-trust validator service 144 identifying the onsite-based state of the Acme backup appliance 130 which has just arrived at the newest Megamax office from the Acme appliance factory. An onsite-based state can be a particular condition related to a specified place where people work.

The onsite-based state includes information about system configurations, user accounts, and system boot up parameters which were previously identified at Acme's appliance factory. For example, the zero-trust validator service 144 identifies the information at the customer location which corresponds to the information that the zero-trust validator service 114 identified at the appliance factory.

After identifying a factory-based state of a computer appliance and an onsite-based state of the computer appliance, any changes are identified between the factory-based state of the computer appliance and the onsite-based state of the computer appliance, block 210. The system compares the information about a computer appliance before and after its transit from a factory to a customer. By way of example and without limitation, this can include the zero-trust validator service 144 identifying changes between the factory-based state of the Acme backup appliance 104 and the onsite-based state of the Acme backup appliance 130, which includes the default user accounts present, the default privileges for user accounts, and the size of specific applications, which includes the increase in the size of a disaster recovery application file.

Having identified any changes between a factory-based state of a computer appliance and an onsite-based sate of the computer appliance, a notification is output that enables any required action based on any identified changes between the factory-based state of the computer appliance and the onsite-based state of the computer appliance, block 212. The system outputs the changes in the information about a computer appliance before and after the computer appliance's transit from a factory to a customer. In embodiments, this can include the zero-trust validator service 144 outputting a notification that enables a customer's security agents to review the unauthorized addition of a system account to an automated user, the unauthorized addition of super user privileges to the automated user's account, and the unauthorized addition of executable code to a large disaster recovery application file for the computer appliance 130, which may have ordinarily escaped detection because the size of the added code is small relative to the size of the disaster recovery application file. Upon further investigation, the customer's security agents determine that when a commonly accessed part of the disaster recovery application would have been accessed, executable code would have been initiated for an automated user, which would have a default user account and default privileges to access all of the computer appliance, and that a Megamax employee who was recently denied a promotion had access to the newly received Acme backup appliance 130 during the time when the unauthorized changes occurred.

A notification can be an alert (typically a pop-up or other message) generated by an application to inform a system user of a new message or update. A required action can be a necessary process or step. An identified change can be a modification that was indicated.

The security risk for the computer appliance 130 is identified based on the identified changes between the factory-based state of the computer appliance 104 and the onsite-based state of the computer appliance 130, instead of the information in the factory-based state of the computer appliance 104 or the information in the onsite-based state of the computer appliance 130. For example, the information identified at an appliance factory does not inherently identify a security risk, and the information identified at a customer location does not inherently identify a security risk. In contrast, since the change between the factory-based state of the computer appliance 104 and the onsite-based state of the computer appliance 130 includes changing information about the default user accounts, this changing information creates a security risk because this information should not have changed between the time when the previous information was identified from the computer appliance 104 at the appliance factory and the time when the current information was identified from the computer appliance 130 while onsite at the customer location.

Although FIG. 2 depicts the blocks 202-212 occurring in a specific order, the blocks 202-212 may occur in another order. In other implementations, each of the blocks 202-212 may also be executed in combination with other blocks and/or some blocks may be divided into a different group of blocks.

All Information Technology companies that ship a computer appliance via a supply chain to their customers may benefit from an enhanced zero-trust validator service 114/144 significantly improving system security. The enhanced zero-trust validator service 114/144 is a secure way to ensure that the computer appliance 104/130 was not tampered with before onsite installation at the customer location. The zero-trust validator service 114/144 enables service company executives to perform computer appliance scrutiny to ensure security as well as flawless installations, and the enhanced zero-trust validator service 114/144 validates hardware as well as software components. The enhanced zero-trust validator service 114/144 provides enforcement by ensuring there are no backdoors open, or any insecure ciphers/protocols kept enabled, and there are no unused or unknown services installed or kept running, or ports opened deliberately.

Figure 3:
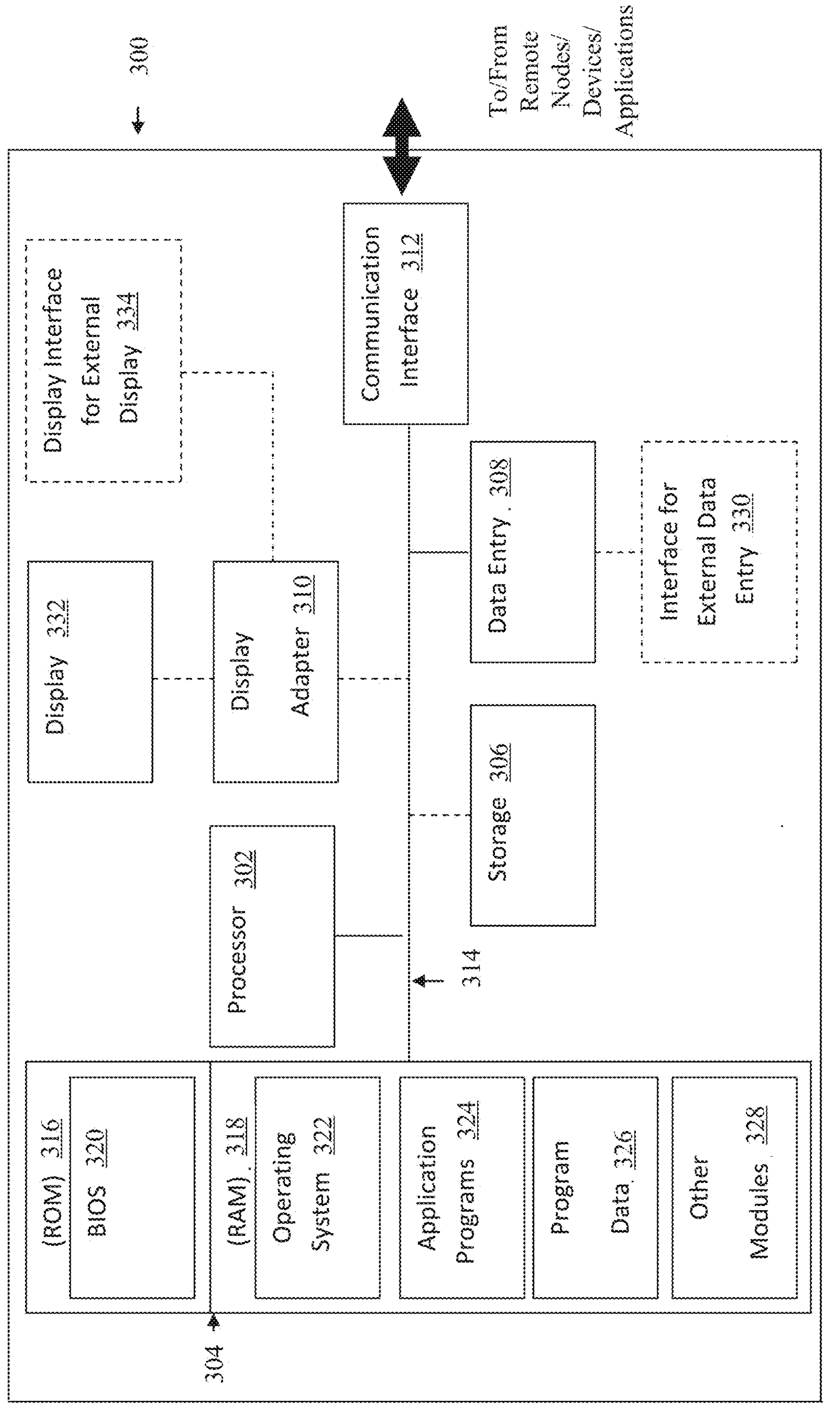
FIG. 3 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3 an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random-access memory (RAM) 318. The memory 304 may be configured to store program instructions and data during operation of the hardware device 300. In various embodiments, the memory 304 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD, or other optical media. The drives and their associated computer-readable media provide nonvolatile storage of computer readable instructions, data structures, program modules and other data for the hardware device 300. It is noted that the methods described herein may be embodied in executable instructions stored in a computer readable medium for use by or in connection with an instruction execution machine, apparatus, or device, such as a computer-based or processor-containing machine, apparatus, or device.

It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for conducting the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330.

By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device, or other common network node, and typically includes many or all the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated if other hardware and/or software to establish communications between the hardware device 300 and other devices may be used.

The arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it.

The computer, which reconfigures or otherwise alters the operation of the device in a manner well understood by those skilled in the art. The data structures where data is maintained are physical locations of the memory that have properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A system for a zero-trust validator service in a computer appliance supply chain, comprising:

one or more processors; and a non-transitory computer readable medium storing a plurality of instructions, which when executed, cause the one or more processors to:

identify a factory-based state of a computer appliance at an appliance factory, wherein the factory-based state includes information about at least one of system configurations, user accounts, or system boot up parameters identified at the appliance factory, in response to detecting that the computer appliance is shutting down at the appliance factory;

identify an onsite-based state of the computer appliance that is onsite at a customer location, wherein the onsite-based state includes information about at least one of system configurations, user accounts, or system boot up parameters identified at the appliance factory, in response to detecting that the computer appliance boots up at the customer location;

identify any changes between the factory-based state of the computer appliance and the onsite-based state of the computer appliance; and output a notification that enables any required action based on any identified changes between the factory-based state of the computer appliance and the onsite-based state of the computer appliance.

2. The system of claim 1, wherein the factory-based state further includes information about software installed at the appliance factory, and the onsite-based state further includes information about software present at the customer location.

3. The system of claim 1, wherein the factory-based state further includes information about hardware integrated at the appliance factory and the onsite-based state includes information about hardware present at the customer location.

4. The system of claim 1, wherein the system configurations comprise information about at least one of default internet protocol table rules, default file system mounts present on the computer appliance, file and directory inventory, or sizes corresponding to specific applications.

5. The system of claim 1, wherein the information about user accounts comprises at least one of default user accounts present on the computer appliance or default privileges for user accounts present on the computer appliance.

6. The system of claim 1, wherein the system boot up parameters comprise information that at least one of verifies that a boot up file is required to have a digital certificate that is valid to boot up the computer appliance, or identifies that specific encryption keys are present on the computer appliance to validate the digital certificate required for the boot up file.

7. The system of claim 1, wherein a security risk for the computer appliance is identified based on the identified changes between the factory-based state of the computer appliance and the onsite-based state of the computer appliance.

8. A computer-implemented method for a zero-trust validator service in a software appliance supply chain, the computer-implemented method comprising:

identifying a factory-based state of a computer appliance at an appliance factory, wherein the factory-based state includes information about at least one of system configurations, user account, or system boot up parameters identified at the appliance factory, in response to detecting that the computer appliance is shutting down at the appliance factory;

identifying an onsite-based state of the computer appliance that is onsite at a customer location, wherein the onsite-based state includes information about at least one of system configurations, user accounts, or system boot up parameters identified at the appliance factory, in response to detecting that the computer appliance boots up at the customer location;

identifying any changes between the factory-based state of the computer appliance and the onsite-based state of the computer appliance; and outputting a notification that enables any required action based on any identified changes between the factory-based state of the computer appliance and the onsite-based state of the computer appliance.

9. The computer-implemented method of claim 8, wherein the factory-based state further includes information about software installed at the appliance factory, and the onsite-based state further includes information about software present at the customer location.

10. The computer-implemented method of claim 8, wherein the factory-based state further includes information about hardware integrated at the appliance factory and the onsite-based state includes information about hardware present at the customer location.

11. The computer-implemented method of claim 8, wherein the system configurations comprise information about at least one of default internet protocol table rules, default file system mounts present on the computer appliance, file and directory inventory, or sizes corresponding to specific applications.

12. The computer-implemented method of claim 8, wherein the information about user accounts comprises at least one of default user accounts present on the computer appliance or default privileges for user accounts present on the computer appliance.

13. The computer-implemented method of claim 8, wherein the system boot up parameters comprise information that at least one of verifies that a boot up file is required to have a digital certificate that is valid to boot up the computer appliance, or identifies that specific encryption keys are present on the computer appliance to validate the digital certificate required for the boot up file.

14. The computer-implemented method of claim 8, wherein a security risk for the computer\appliance is identified based on the identified changes between the factory-based state of the computer appliance and the onsite-based state of the computer appliance.

15. A computer program product, comprising a non-transitory computer-readable medium having a computer-readable program code embodied therein to be executed by one or more processors, the program code including instructions to:

identify a factory-based state of a computer appliance at an appliance factory, wherein the factory-based state includes information about at least one of system configurations, user accounts, or system boot up parameters identified at the appliance factory, in response to detecting that the computer appliance is shutting down at the appliance factory;

identify an onsite-based state of the computer appliance that is onsite at a customer location, wherein the onsite-based state includes information about at least one of system configurations, user accounts, or system boot up parameters identified at the appliance factory, in response to detecting that the computer appliance boots up at the customer location;

identify any changes between the factory-based state of the computer appliance and the onsite-based state of the computer appliance; and output a notification that enables any required action based on any identified changes between the factory-based state of the computer appliance and the onsite-based state of the computer appliance.

16. The computer program product of claim 15, wherein the factory-based state further includes information about software installed at the appliance factory and information about hardware integrated at the appliance factory, and the onsite-based state further includes information about software present at the customer location and information about hardware present at the customer location.

17. The computer program product of claim 15, wherein the system configurations comprise information about at least one of default internet protocol table rules, default file system mounts present on the computer appliance, file and directory inventory, or sizes corresponding to specific applications.

18. The computer program product of claim 15, wherein the information about user accounts comprises at least one of default user accounts present on the computer appliance or default privileges for user accounts present on the computer appliance.

19. The computer program product of claim 15, wherein the system boot up parameters comprise information that at least one of verifies that a boot up file is required to have a digital certificate that is valid to boot up the computer appliance, or identifies that specific encryption keys are present on the computer appliance to validate the digital certificate required for the boot up file.

20. The computer program product of claim 15, wherein a security risk for the computer appliance is identified based on the identified changes between the factory-based state of the computer appliance and the onsite-based state of the computer appliance.

* * * * *